Patented July 4, 1939

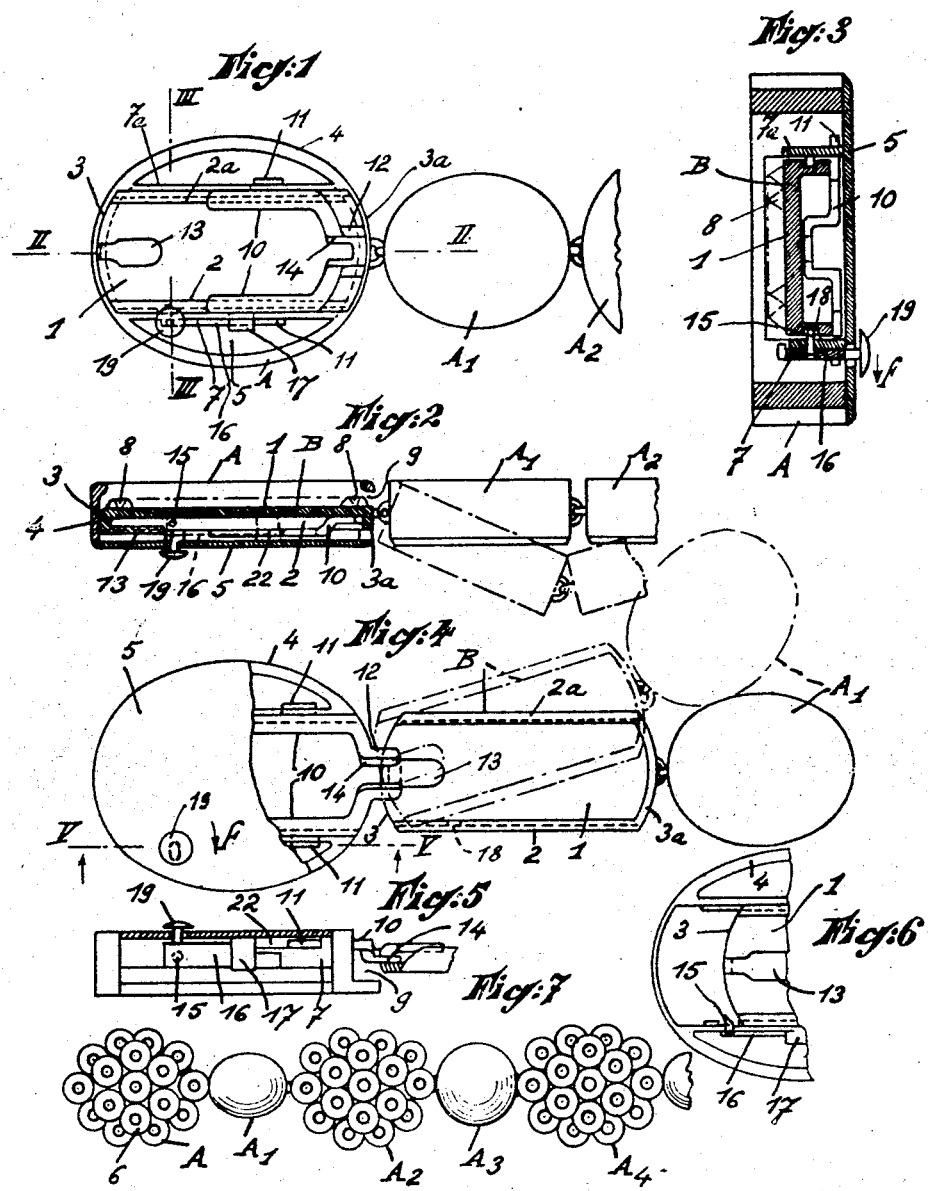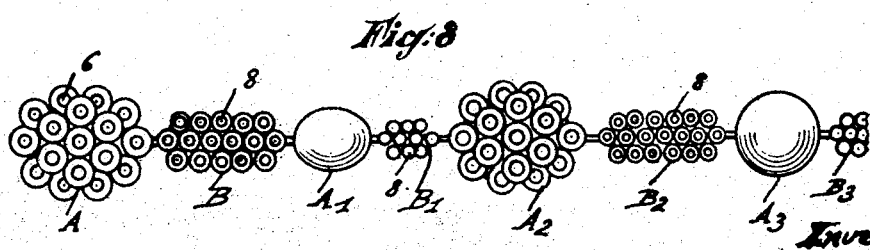

2,164,562

UNITED STATES PATENT OFFICE 2,164,562

EXTENSIBLE JEWEL

Georges Albert Julien Bezault, Juvisy-sur-Orge, France, assignor to Cartier, Societe Anonyme, Paris, France, a company of France Application May 11, 1938, Serial No. 207,365
In France February 24, 1938

10 Claims. (Cl. 63—1)

The present invention relates to jewels, such for instance as bracelets or necklaces, made of a plurality of elements disposed adjacent to one another so as to form a kind of band.

The object of the present invention is to provide a jewel of this kind which is extensible, that is to say the length of which can be considerably increased, for instance doubled.

A more specific object of the present invention is to provide a composite jewel which, when retracted, constitutes a bracelet, while, when extended, it constitutes a necklace.

Still another object of the present invention is to provide a necklace which, in the retracted state, forms a mere band closely surrounding the neck, whereas, in the extended state, it constitutes a neck chain or sautoir, so that this jewel can be adapted to the neck of a gown and to the requirements of fashion.

According to the chief feature of the present invention, this jewel is made of two groups of elements which, in the extended state of the jewel are alternated, each element of the second group being adapted to be slidably engaged into a corresponding contiguous element of the first group, so that, in the retracted state thus obtained, the jewel seems to include only elements of the first group.

According to my invention, the means for slidably engaging the elements of the second group into the corresponding elements of the first group are so devised that, in the extended state of the jewel, the respective elements of both groups have, with respect to one another, the necessary freedom of articulation, and that, however, the engagement of an element of the second group into the corresponding element of the first group always takes place correctly, without difficulty and without taking any special precaution.

According to an embodiment of the present invention, each element of the second group includes, at the end thereof at which it is jointed to the corresponding element of the first group, an open hook which, when the necklace is extended, comes into engagement with a stirrup-shaped piece to which it is articulated. When the jewel is in the retracted state, said stirrup-shaped member is wholly enclosed in the element of the first group and it can slide therein when the jewel is being expanded so as to project from said element of the first group sufficiently for providing a flexible articulation of the hook carried by the element of the second group.

Other features of the present invention will result from the following detailed description of a specific embodiment thereof.

A preferred embodiment of the present invention will be hereinafter described, with reference to the accompanying drawing, given merely by way of example, and in which:

Fig. 1 shows an element of the first group, seen from below, the bottom plate being supposed to have been removed so as to show the element of the first group present therein, and also the means for assembling these two last mentioned elements together.

Fig. 2 is a sectional view on the line II—II of Fig. 1;

Fig. 3 is a transverse sectional view, on an enlarged scale, on the line III—III of Fig. 1;

Fig. 4 is a bottom plan view, with portions cut away, of the elements of Fig. 1 in the expanded position;

Fig. 5 is a sectional view on the line V—V of Fig. 4;

Fig. 6 is a partial plan view of an element of the first group, showing the corresponding element of the second group in the course of its engagement thereinto;

Fig. 7 shows a portion of a necklace or bracelet according to the invention, shown in the retracted position thereof;

Fig. 8 is a view similar to Fig. 7 showing the jewel in the extended position.

In the drawing, the successive elements of the first group are designated by reference characters A, $A_1$, $A_2$, $A_3$ . . ., and the corresponding elements of the second group by B, $B_1$, $B_2$, $B_3$ . . .

Figs. 7 and 8 clearly show their relative arrangements. The various elements of the first group may be of any shape and size, whereas the elements of the second group are necessarily of a length at least equal to that of the corresponding element of the first group and of a smaller width.

The element B shown by Figs. 1 to 6 is constituted by a plate 1 having two parallel rectilinear edges 2 and 2a, the two other edges, to wit 3 and 3a being for instance curvilinear and symmetrical. The shape of edge 3a is preferably adapted to the outline of the corresponding element A.

This element A is constituted by a ring 4, for instance oval-shaped, on which is welded a bottom plate 5, and which carries, on its opposite face any ornamentative structure 6, made for instance of fine or artificial stones (Figs. 7 and 8), of metal, either precious or not, chiseiled, enamelled, etc. Inside the hollow body thus constituted, I provide two slideways 7 and 7a, rectilinear and parallel, analogous to rails. The corresponding element B is slidably mounted with respect to said slideways, along which edges 2 and 2a can move. This element B is adapted to be wholly enclosed inside the cavity of element A, between slideways 7 and 7a. For this purpose, even if element B is provided with an ornamental face 8, the latter must always be such that the total thickness of the element remains always smaller than the height of the passage 9 provided in the side of ring-shaped member 4.

At their lower parts, slideways 7 and 7a further serve to guide a sliding member 10, in the form of a horse shoe, the displacements of which are limited by two lateral lugs 11, rigid therewith and engaged in longitudinal notches or slots 22 provided in said slideways 7 and 7a. The top part of said piece 10 carries a small stirrup-shaped member 12. A hook 13 carried by the edge 3 of element B is adapted to engage with said stirrup-shaped member 12 when said element B is pulled out from element A. This stirrup-shaped member 12 is preferably provided with a slideway 14 in which move the parallel edges of hook 13, whereby element B is always correctly engaged in the slideways of element A when it is to be retracted thereinto.

One of the slideways, for instance 7, carries a spring blade 16, fixed thereto at 17 and provided at its free end with a lug 15 which engages into a corresponding hole of the slideway and normally projects across the path of travel of element B. When said element is being inserted into element A, its oblique edge 3 cooperates with the bevel-shaped end of lug 15 (Fig. 6) so as to push back the latter and to ensure a free passage for element B. When said element B has reached the end of its inward stroke (Figs. 1 to 3), lug 15 elastically penetrates into a corresponding hole 18 provided in the edge 2 of element B. If, now, it is desired to expand the jewel, it is first necessary to disengage the lug 15 by moving in the direction of arrow f (Fig. 3) a button 19 or any other operating member the rod of which extends through plate 5 owing to the provision of a small slot in said plate.

Figs. 2 and 4, on which I have shown in dotted lines the positions of elements $A_1$, B, $A_2$ in positions in which they make an angle with respect to one another, clearly show that, as well in the expanded state as in the retracted state of the jewel, all the elements thereof are hinged to one another, with a sufficient flexibility. This flexibility is due, in the expanded position of the jewel (as shown by Fig. 4), to the fact that stirrup-shaped member 12 projects from the body of element A.

In order to avoid partial engagement of element B into element A, when such an engagement is not desired, it is of advantage to provide a certain elastic friction between the tongue of hook 13 and the slideway of stirrup-shaped member 12.

Of course, the expansible according to the present invention, an example of which has been above described in detail, permits all kinds of shape combinations and various ornamentations for the respective elements.

Also, it should be noted that the jewel might include so-called neutral elements, that is to say elements belonging neither to group A nor to group B and merely interposed, for instance, between two elements of the first group in the usual manner.

In a general manner, while I have, in the above description, disclosed what I deem to be practical and efficient embodiments of the present invention, it should be well understood that I do not wish to be limited thereto as there might be changes made in the arrangement, disposition, and form of the parts without departing from the principle of the present invention as comprehended within the scope of the appended claims.

What I claim is:

1. A jewel of the kind including bracelets and necklaces, which comprises, in combination, a plurality of elements hingedly interconnected in series with one another, at least one of said elements being hollow, two parallel longitudinal slideways in said hollow element, the next element being so shaped and dimensioned as to be able to be housed in the hollow element between said slideways, means carried by said second mentioned element adapted to cooperate with said slideways for guiding said second mentioned element with respect to said first mentioned element, means for locking said two elements with respect to each other in the position in which one is housed inside the other, a member slidable in said hollow element parallelly to said slideways, and cooperating hook means carried by said sliding member and said second mentioned element for interconnecting these two last mentioned parts with relative freedom of movement therebetween, the hook means carried by said sliding member being adapted to project from the outline of said hollow element when said sliding member is pulled toward the outside of said hollow element.

2. A jewel of the kind including bracelets and necklaces, which comprises, in combination, a plurality of elements hingedly interconnected in series with one another, at least one of said elements being hollow, two parallel longitudinal slideways in said hollow element, the next element being so shaped and dimensioned as to be able to house inside the hollow element between said slideways, means carried by said second mentioned element adapted to cooperate with said slideways for guiding said second mentioned element with respect to said first mentioned element, means for locking said two elements with respect to each other in the position in which one is housed inside the other, a member slidable between said slideways parallelly thereto, means carried by said member adapted to cooperate with said slideways for limiting the longitudinal displacement of said member, and cooperating hook means carried by said sliding member and said second mentioned element for interconnecting these two last mentioned parts with relative freedom of angular displacement therebetween, the hook means carried by said sliding member being adapted to project from the outline of said hollow element when said sliding member is pulled outwardly with respect to said hollow element.

3. A jewel of the kind including bracelets and necklaces, which comprises, in combination, a plurality of elements hingedly interconnected in series with one another, at least one of said elements being hollow, two parallel longitudinal slideways in said hollow element, the next element being so shaped and dimensioned as to be able to house inside the hollow element between said slideways, means carried by said second mentioned element adapted to cooperate with said slideways for guiding said second mentioned element with respect to said first mentioned element, means for locking said two elements with respect to each other in the position in which one is housed inside the other, a member slidable in said hollow element between said slideways and parallel thereto, means carried by said member adapted to cooperate with said slideways for limiting the longitudinal displacement of said member, cooperating hook means carried by said sliding member and said second mentioned element for interconnecting these two last mentioned parts with relative freedom of angular displacement therebetween, the hook means carried by said sliding member being adapted to project from the outline of said hollow element when said sliding member is pulled outwardly with respect to said hollow element, and a slideway carried by said sliding member for guiding the hook means carried by the second mentioned element with respect to said sliding member.

4. A jewel according to claim 3 in which said hook means carried by the second mentioned element are mounted with an elastic friction in said last mentioned slideway, in such manner as to avoid accidental engagement of the second mentioned element into the hollow element.

5. A jewel of the kind including bracelets and necklaces, which comprises, in combination, a plurality of elements hingedly interconnected in series with one another, at least one of said elements being hollow, two parallel longitudinal slideways in said hollow element, the next element being so shaped and dimensioned as to be able to house inside the hollow element between said slideways, means carried by said second mentioned element adapted to cooperate with said slideways for guiding said second mentioned element with respect to said first mentioned element, an elastic blade carried by the outer face of said slideways, a projection at the end of said blade, a hole provided in said slideways whereby said projection pentrates into the inside of said slideways, a hole adapted to accommodate said projection provided in said second mentioned element, whereby said second mentioned element is locked with respect to said slideways when housed fully inside said hollow element, means operative manually from the outside for removing said projection from said hole, a member slidable in said hollow element between said slideways and parallel thereto, means carried by said member adapted to cooperate with said slideways for limiting the longitudinal displacement of said member, cooperating hook means carried by said sliding member and said second mentioned element for interconnecting said two last mentioned parts with relative freedom of angular displacement with respect to each other, the hook means carried by said sliding member being adapted to project from the outline of said hollow element when said sliding member is pulled outwardly with respect to said hollow element, and a slideway carried by said sliding member for guiding the hook means carried by the second mentioned element with respect to said sliding member.

6. A jewel of the kind including bracelets and necklaces, which comprises, in combination, a series of hinged elements, at least one of said elements being hollow and the next element being slidable into and out of said hollow element, cooperating means carried by said two last mentioned elements respectively for hingedly connecting them together in the outer position of said second mentioned element about two axes at right angles to each other, and means for locking said two elements in the position in which one is engaged in the other.

7. A jewel of the kind including bracelets and necklaces, which comprises, in combination, a series of hingedly assembled elements, at least one of said elements being hollow, and the next element, which is so shaped and dimensioned as to be able to house inside said hollow element, being slidable into, and out of, said hollow element, cooperating means carried by said two last mentioned elements respectively for hingedly connecting them together, in the outer position of said second mentioned element, about two axes at right angles to each other, and means for locking said second mentioned element inside the other.

8. A jewel of the kind including bracelets and necklaces, which comprises, in combination, a series of hingedly assembled elements, at least one of said elements being hollow, and the next element, which is so shaped and dimensioned as to be able to house inside said hollow element, being slidable into, and out of, said hollow element, cooperating means, carried by said two last mentioned elements, respectively, for interconnecting them with relative freedom of angular displacement therebetween in all directions, and means for locking said second mentioned element inside the other.

9. A jewel of the kind including bracelets and necklaces, which comprises, in combination, a series of hingedly assembled elements, at least one of said elements being of flat hollow shape, and the next flat element, which is so shaped and dimensioned as to be able to house inside said hollow element, being slidable into, and out of, said hollow element, cooperating means carried by said two last mentioned elements, respectively, for interconnecting them with relative freedom of angular displacement therebetween in all directions, and means for locking said second mentioned element inside the other.

10. A jewel of the kind including bracelets and necklaces, which comprises, in combination, a series of hingedly assembled elements, at least one of said elements being of flat hollow shape, and the next flat element, which is so shaped and dimensioned as to be able to house inside said hollow element, being slidable into, and out of, said hollow element, an eye carried by one of said element and a hook carried by the other being adapted to cooperate together for interconnecting said two elements with a limited freedom of angular displacement therebetween in all directions, and means for locking said second mentioned element inside the other.

GEORGES ALBERT JULIEN BEZAULT.